United States Patent [19]
Lange

[11] Patent Number: 5,589,823
[45] Date of Patent: Dec. 31, 1996

[54] REMOTE STATUS INDICATOR FOR HOLDING TANKS CONTAINING NO MOVING PARTS

[76] Inventor: Robert Lange, 18652 Midway, Allen Park, Mich. 48101

[21] Appl. No.: 365,702

[22] Filed: Dec. 29, 1994

[51] Int. Cl.$^6$ .................................................. G08B 21/00
[52] U.S. Cl. ........................... 340/622; 340/618; 340/620; 73/295; 4/321
[58] Field of Search .................................... 340/622, 618, 340/620; 73/295; 4/321

[56] References Cited

U.S. PATENT DOCUMENTS

| | | | |
|---|---|---|---|
| 3,600,946 | 8/1971 | Ziemba | 73/295 |
| 3,792,456 | 2/1974 | Hill | 340/244 R |
| 3,933,636 | 1/1976 | Daniels | 210/739 |
| 4,140,996 | 2/1979 | Leitch | 340/52 R |
| 4,324,007 | 4/1982 | Morris | 4/319 |
| 4,361,038 | 11/1982 | Schuler | 73/295 |
| 4,564,834 | 1/1986 | Steele | 340/622 |
| 4,609,913 | 9/1986 | Atbogast et al. | 340/622 |
| 4,638,288 | 1/1987 | Remec | 340/52 F |
| 4,739,658 | 4/1988 | Slavik | 73/313 |
| 4,929,930 | 5/1990 | Rezabek | 340/622 |
| 5,079,950 | 1/1992 | McKiernan | 73/313 |
| 5,197,329 | 3/1993 | Grundy | 73/295 |
| 5,294,917 | 3/1995 | Wilkins | 340/625 |

FOREIGN PATENT DOCUMENTS

| | | | |
|---|---|---|---|
| 285919 | 10/1966 | Australia | 340/622 |

*Primary Examiner*—Jeffery Hofsass
*Assistant Examiner*—Daniel J. Wu
*Attorney, Agent, or Firm*—Brooks & Kushman P.C.

[57] ABSTRACT

A transistor and integrated circuit-free remotely indicating status device for holding tanks for recreational vehicles and pleasure boats contains no moving parts, is resistant to corrosion, and is inexpensively and simply manufactured and installed. In one embodiment, common LED indicating devices may be alternatively toggled between water tank and waste tank sensor circuits.

20 Claims, 3 Drawing Sheets

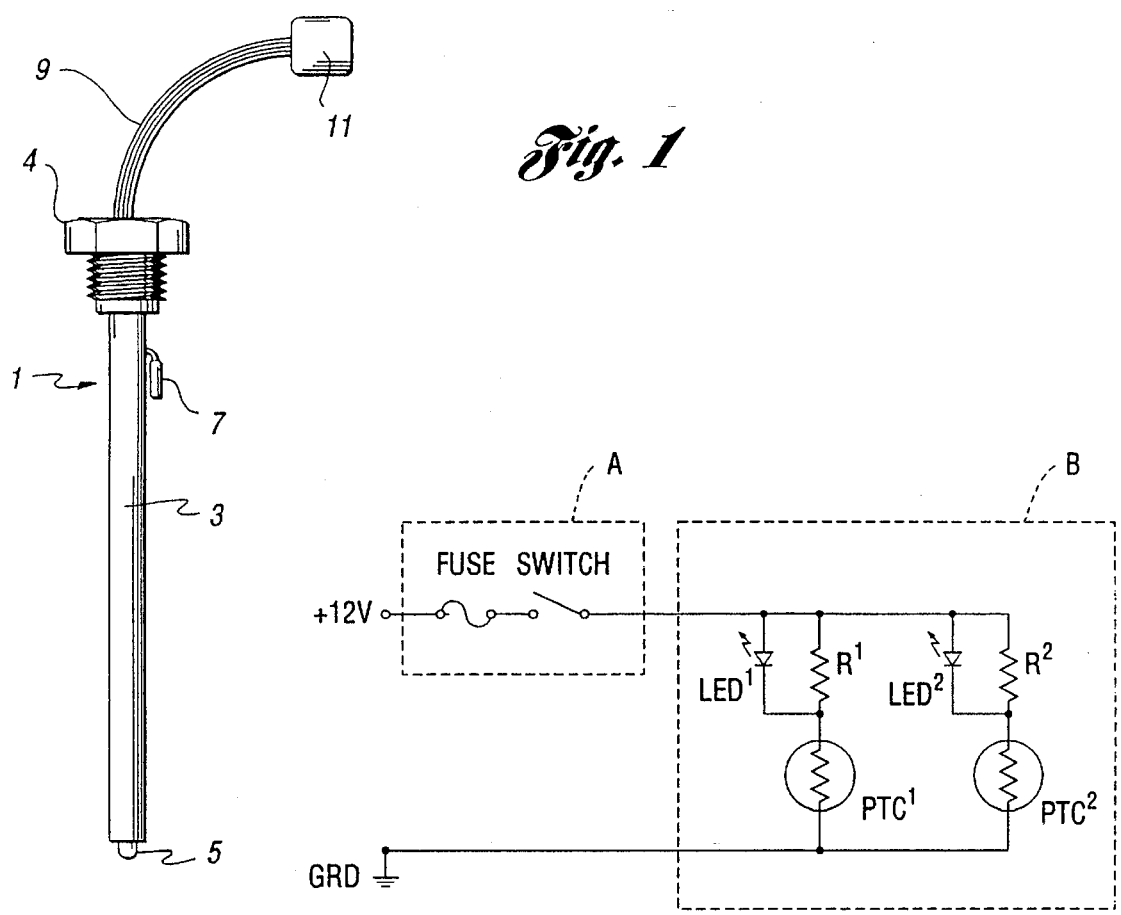
Fig. 1
Fig. 2
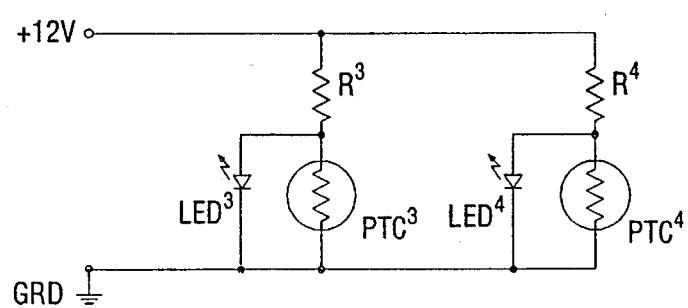
Fig. 3

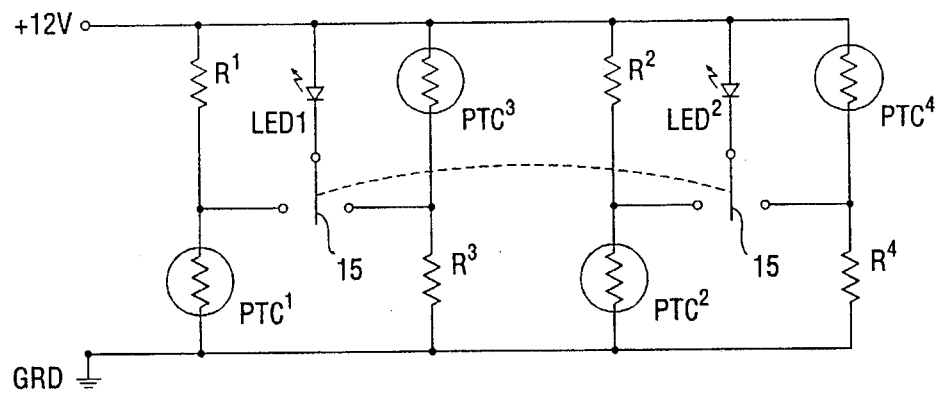
*Fig. 4*
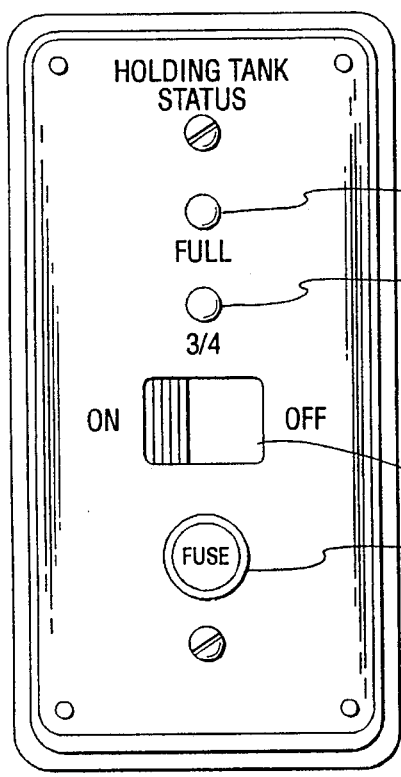
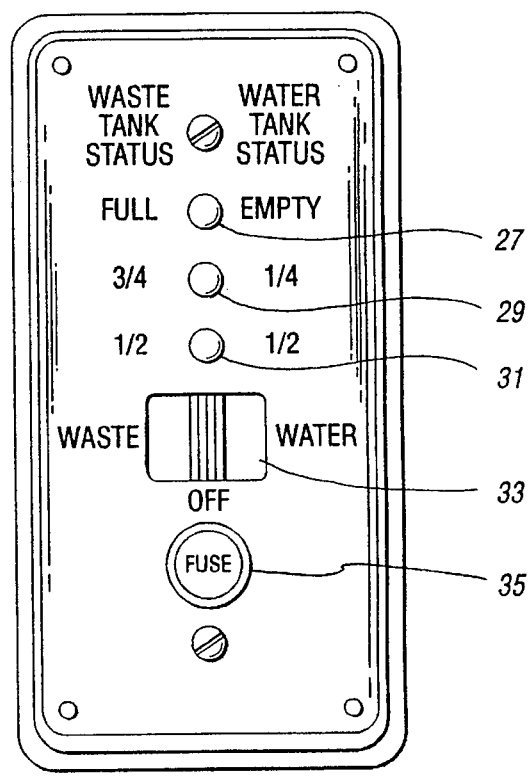
*Fig. 5a*  *Fig. 5b*

REMOTE STATUS INDICATOR FOR HOLDING TANKS CONTAINING NO MOVING PARTS

TECHNICAL FIELD

The present invention pertains to a status indicator for holding tanks such as those found on recreational vehicles and pleasure boats containing no moving parts. More particularly, the subject invention pertains to a remote status indicator for holding tanks which is all-electronic in operation, simple to manufacture, and install. The device contains no transistors or integrated circuits, and therefore is easily connected directly to the electrical system of the vehicle.

BACKGROUND ART

Recreational vehicles (RVs) and pleasure boats generally contain two holding tanks, one for fresh water, and one for waste. The latter is generally called the waste tank, although the term "holding tank" is sometimes used also in the more limited sense to describe the waste tank. In the present application, the term "holding tank" refers to both the fresh water tank and the waste tank. The status of these tanks, i.e. whether full, partially full, or empty, must be monitored. While it is often acceptable to run out of potable water due to the water tank becoming empty, the situation with respect to the waste tank is completely different. The inability to utilize toilet facilities, especially in pleasure boats which may be a great distance from shore, creates a highly uncomfortable and medically undesirable constraint which is highly unsatisfactory. Moreover, although water is removed from the water tank by a pump, and therefore the water tank itself is not under pressure, the reverse is generally true with respect to holding tanks, where the commonly used toilets pump waste under pressure into the tank. Continuing to pump waste, either electrically, or manually, into a filled holding tank may result in rupture of the lines or the tank within the vehicle or boat, or may cause the tank to overflow through the vent, creating an extremely unsanitary condition.

Water tanks on recreational vehicles and pleasure boats are generally not monitored, due to the expense of providing a monitoring apparatus, and for other reasons which will become apparent in later discussion. Due both to the necessity of having a working sanitary system, as well as the potential problems which could be caused by leakage or overflow of waste from the waste tank, however, waste tanks are generally provided with a sensor in at least the higher cost vehicles and pleasure boats, especially those designed for long trips or, in the case of boats, where considerable use away from marinas or dockage is to be expected.

Level sensing means used in the past have not proven acceptable in the environments in which RVs and pleasure boats are used. For example, an analog level sensing device comprising a float attached to a cable, or a rheostat and the latter connected to a dial indicator, have been used in the past. Such devices are not acceptable for long-term use in either water tanks or waste tanks. In both applications, the constant violent sloshing of the tank contents during normal operation of vehicle, for example, when an RV encounters a large bump or depression in the road surface, or a pleasure boat encounters a wave, wake, or merely stormy weather, places great stress on the operating mechanisms of such devices, and thus their lifespan is greatly limited. It is not uncommon to replace such devices every one or two years of vehicle operation, due to bending or breakage of the components. In the case of waste tanks, the situation is exacerbated by the constituents of the waste itself. Human waste, as well as toilet paper and other material which occasionally may find its way into the waste tank, may foul the mechanism of such mechanical devices, rendering them inoperable even though component failure has not occurred. In either case, many owners prefer not to replace these components, therefore running a risk of an extremely discomforting or unsanitary condition, due to the cost of the replacement, and the cost and unsanitary nature of the replacement process.

To increase the reliability of such level sensors, hybrid electronic/mechanical sensors have been devised. In U.S. Pat. No. 4,140,996, for instance, is disclosed a device having a flexible PVC tubing inserted into the waste tank. The PVC tubing contains a magnetically actuated reed switch mounted at a predetermined level on the PVC tubing. A cylindrical float surrounds the PVC tubing, and contains a magnet which can activate the reed switch. As the float is proximate to the reed switch at only a given level of fill, an integrated circuit is necessary to monitor the past history of the fill indicators.

While such a device is an improvement over purely mechanical devices, it suffers from numerous drawbacks. First and foremost, free movement of the float up and down the PVC shaft is necessary in order for the device to function. In a water tank, where no solid material is available to impede the operation of the float, the device should work successfully provided that the fatigue encountered by the PVC tubing as it flexes due to the impact of sloshing water against the float does not fracture the PVC tubing over time. In a waste tank, the situation is different, however, as the nature of the material present may clog the space between the float and the tubing, thus creating erratic behavior or even total inactivation of the device. Second, the use of a complex integrated circuit monitoring device increases the cost of the unit dramatically, thus in a practical sense preventing its application on many low end recreational vehicles and pleasure boats, as well as encouraging non-replacement of failed components.

In U.S. Pat. No. 4,739,658, is disclosed a completely electronic monitoring device employing multiple conductivity probes, one for each level desired to be sensed. The conductivity probes and a reference probe are connected in a bridge circuit which is then monitored and converted to an appropriate visual display. The use of conductivity probes is problematic, however. In the case of water tanks, even the low amount of current flowing through the water in the tank may cause electrolysis or leaching of metallic ions from the conductivity probes into the water, thus decreasing the value of the water as a potable source. In the case of a waste tank, the conductivity probes may be coated with sludge, or may have solid material wedged between the conductive electrodes, thus again rendering the device erratic or inoperable. Finally, the metallic probes utilized in such systems are not generally acceptable for use in salt water environments, where corrosion is a severe problem. The necessity for having a complex bridge circuit and other electrical components increases the cost of the device.

A similar system is disclosed in U.S. Pat. No. 4,140,996. However, in the '996 patent, various conductivity probes in various tanks are multiplexed and utilized to provide a digital display indicating status of components. Such a system suffers from the same drawbacks as indicated for the '658 patent, and in addition requires even more complex electronic circuitry, thus further increasing the cost of the system.

In U.S. Pat. No. 3,600,946, is described an electronic level detector useful for detecting brake fluid level in an automotive or other vehicle braking system. The device disclosed in the '946 patent utilizes as the primary sensing element, a silicon semiconductive resistance material displaying both a positive and a negative temperature coefficient of resistance in series with a second device, preferably mounted to the wall of the tank, which monitors the ambient temperature, and which itself displays a positive temperature coefficient. The latter device may be made, for example, of nickel, platinum, copper, or iron, all of which have positive temperature coefficients of approximately 0.4% per degree Celsius.

In the '946 device, an incandescent indicator lamp is connected in series with the sensors and is energized by the vehicle power supply. Components are selected so as to keep the operating parameters of the device in the negative temperature coefficient region while the device is immersed in liquid, thus presenting a high resistance in the circuit, and preventing the lamp from energizing. If the liquid level should fall below the primary sensor, the resistance decreases, causing current to flow through the circuit and energizing the incandescent lamp. The necessity of employing two sensors for each level to be detected increases both the initial manufacturing costs as well as the cost of installation of the device. Moreover, an incandescent lamp which draws an appreciable amount of current, is utilized as a visual indicating element, and should the device be inadvertently left on while the vehicle is unattended, a current drain on the battery could render the vehicle inoperable after a relatively short period of time.

In U.S. Pat. No. 3,792,456 is disclosed a complex level detection device containing a positive temperature coefficient resistor mounted so as to be both thermally coupled to the liquid whose level is to be sensed, and electrically coupled through the liquid to the wall of the container in which the liquid is contained. A warning device is activated by the transistorized circuitry in the case where the temperature rise of the liquid exceeds a predetermined value, or the impedance of the device with respect to ground is altered as would be the case when the liquid level falls below the level of the sensing device. While the device of U.S. Pat. No. 3,792,456 is suitable for detection of low fluid level, the device is not suitable for detection of fluid levels higher than the sensing device. Moreover, the cost of the many electronic components necessary in the device increases the cost substantially, and the device is not suitable for use in polymer tanks, which are common on RVs and pleasure boats.

In U.S. Pat. No. 4,564,834 is disclosed a device suitable for detecting low levels of fluid in an engine crankcase. The device disclosed in the '834 patent includes two positive temperature coefficient elements, both located at the same height, but having different thermal loss coefficients. A voltage level detecting circuit monitors the difference in voltage drop across the two devices, and latches to light an appropriate indicator lamp when the oil level in the crankcase falls below the level of the detectors. The use of two positive temperature coefficient devices as well as the transistorized or integrated circuit voltage comparator increases the cost of the system undesirably. Moreover, the use of an incandescent lamp as a status indicator can cause an undesirable drain on the vehicle electrical system were the device to be operational when the alternator attached to the vehicle engine is not operating.

In U.S. Pat. No. 4,638,288 is disclosed a multiplexed monitoring device for various vehicle liquid systems employing PTC resistor sensors. The status of the PTC resistors are used to bias monitoring transistors which, in turn, activate a tone generator to supply an aural warning signal. The system employs many components, and thus the cost of the device is unacceptable for many applications. Moreover, the probes illustrated in the patent are susceptible to corrosion, thus limiting lifespan of the device in corrosive environments such as those encountered in salt water.

The unsuitability of the prior art devices for use in recreational vehicles, and especially pleasure boats, is highlighted by the fact that only one aftermarket electronic device is generally available on the market, that device having a cost in the range of $400–$500. Recreational vehicles and pleasure boats at the low end of the cost scale are generally not provided with status indicators for water tanks or waste tanks due to the cost involved. In higher end vehicles and pleasure boats, devices supplied are generally of the mechanical, hybrid electronic/mechanical, or conductivity-type probes which have limited lifespans and suffer from erratic behavior.

It would be desirable to be able to supply to the recreational vehicle industry and pleasure boat industry, a level sensing device which is simple to design and manufacture, and easily installed, which contains no moving parts, which is not susceptible to corrosion and salt water environments, and which is capable of providing reliable operation over a long lifespan. Such a device has not been previously available.

OBJECTS OF THE INVENTION

It is an object of the invention to produce a reliable level-detecting device for use in water tanks and holding tanks for RVs and pleasure boats which contains no moving parts.

It is a further object of the invention to produce a level sensor for water tanks and waste tanks for RVs and pleasure boats which is not susceptible to corrosion in salt water environments.

It is yet a further object of the invention to produce a level-sensing device for water tanks and waste tanks which is economical to manufacture and install.

These and other objects are met by the device as described herein.

SUMMARY OF THE INVENTION

The subject invention pertains to a transistor and integrated circuit-free device for remotely indicating the fill status of a liquid-containing holding tank on a recreational vehicle or pleasure boat having a direct current voltage supply. The device comprises at least one sensing element support adapted to be inserted in a holding tank. A plurality of sensor elements are mounted to the sensing element(s), the sensor elements positioned at different heights relative to the liquid contained in the tank. The height of each of the sensor elements corresponds to a level of liquid whose status is to be monitored. Each of the sensor elements comprises a positive temperature coefficient resistor characterized by a resistance/temperature curve exhibiting relatively low resistance below a given temperature, and a steeply rising resistance above the given temperature. A parallel electrical circuit having a plurality of branches is biased by the direct current electrical supply circuit. Each of the branches comprises one of the sensor elements and a current limiting resistor associated therewith. A plurality of light emitting diodes having a non-emitting off-state and an emitting on-state, are mounted remotely from the sensor elements. Each of the light-emitting diodes is associated with a branch of the parallel circuit such that the on/off state of the light emitting diode changes in response to the liquid level passing the position of the sensor element which forms a part of the same parallel circuit branch with which the light-emitting diode is associated.

The subject invention further pertains to a transistor and integrated circuit-free device for alternatively monitoring the fill status of a water tank and a waste tank on a recreational vehicle or pleasure boat having a direct current power supply. The device comprises at least one water tank sensing element support adapted to be inserted in the water tank and a plurality of water tank sensor elements mounted to the water tank sensing element(s), the sensor elements positioned at different heights relative to the level of water in the water tank, the height of each of the sensor elements corresponding to a level of water whose status is to be monitored. At least one waste tank sensing element support is adapted to be inserted in the waste tank, and a plurality of waste tank sensor elements are mounted to the waste tank sensing element(s). The sensor elements are positioned at different heights relative to the level of waste in the waste tank, the height of each of the sensor elements corresponding to a level of waste whose status is to be monitored. The sensor elements comprise positive temperature coefficient resistors characterized by a resistance/temperature curve exhibiting relatively low resistance below a given temperature and a steeply rising resistance above the given temperature. A parallel electrical monitoring circuit has a plurality of water tank monitoring branches and a plurality of waste tank monitoring branches. Each of the water tank monitoring branches comprises a water tank sensor element and a current limiting resistor associated therewith, and each of the waste tank monitoring branches similarly comprises a waste tank sensor element and a current limiting resistor associated therewith. A plurality of light-emitting diodes are alternatively connected across the respective current limiting resistors associated with the waste tank sensor elements when the status of the waste tank is to be monitored, and across the water tank sensor elements when the water tank status is to be monitored, such that the light-emitting diodes alternatively monitor waste tank or water tank status. When a selecting switch is in a position selecting water tank status monitoring, the voltage drop across the respective water tank sensor elements associated with the light-emitting diode is such as to cause the light-emitting diode associated with the respective sensor element to emit light when the respective sensor element is in a high resistance condition due to the water level in the water tank falling below the position of the respective water tank sensor element, allowing the respective water tank sensor elements temperature to rise above its turnover temperature, but the voltage drop across a respective water tank sensor element is insufficient to cause the light emitting diode to emit light when the respective water tank sensor element is in a low resistance condition due to being immersed in water. When the switch is in a position selecting waste tank status monitoring, the voltage drop across the current limiting resistor associated with the light-emitting diode is such to cause the light-emitting diode to emit light when the respective waste tank sensor element is in a low resistance condition due to being immersed in waste, but the voltage drop across the current limiting resistor associated with the light-emitting diode is insufficient to cause the light emitting diode to emit light when the respective waste tank sensor element is in a high resistance condition due to being positioned above the level of waste in the waste tank, allowing the temperature of the respective waste tank sensor element to rise above said given temperature.

BRIEF DESCRIPTION OF THE DRAWINGS

FIG. 1 illustrates one embodiment of a sensing probe for use in monitoring holding tank status;

FIG. 2 illustrates an electrical schematic diagram of one embodiment of a device suitable for use in monitoring the status of a holding tank;

FIG. 3 represents an electrical schematic diagram of one embodiment of a device suitable for use in monitoring the status of a water tank;

FIG. 4 illustrates an electrical schematic diagram of a combination device suitable for use in alternatively monitoring the status of a water tank or a holding tank;

FIG. 5 illustrates two embodiments of panel displays for use with a monitoring device of the present invention.

DESCRIPTION OF THE PREFERRED EMBODIMENTS

Figure 6:
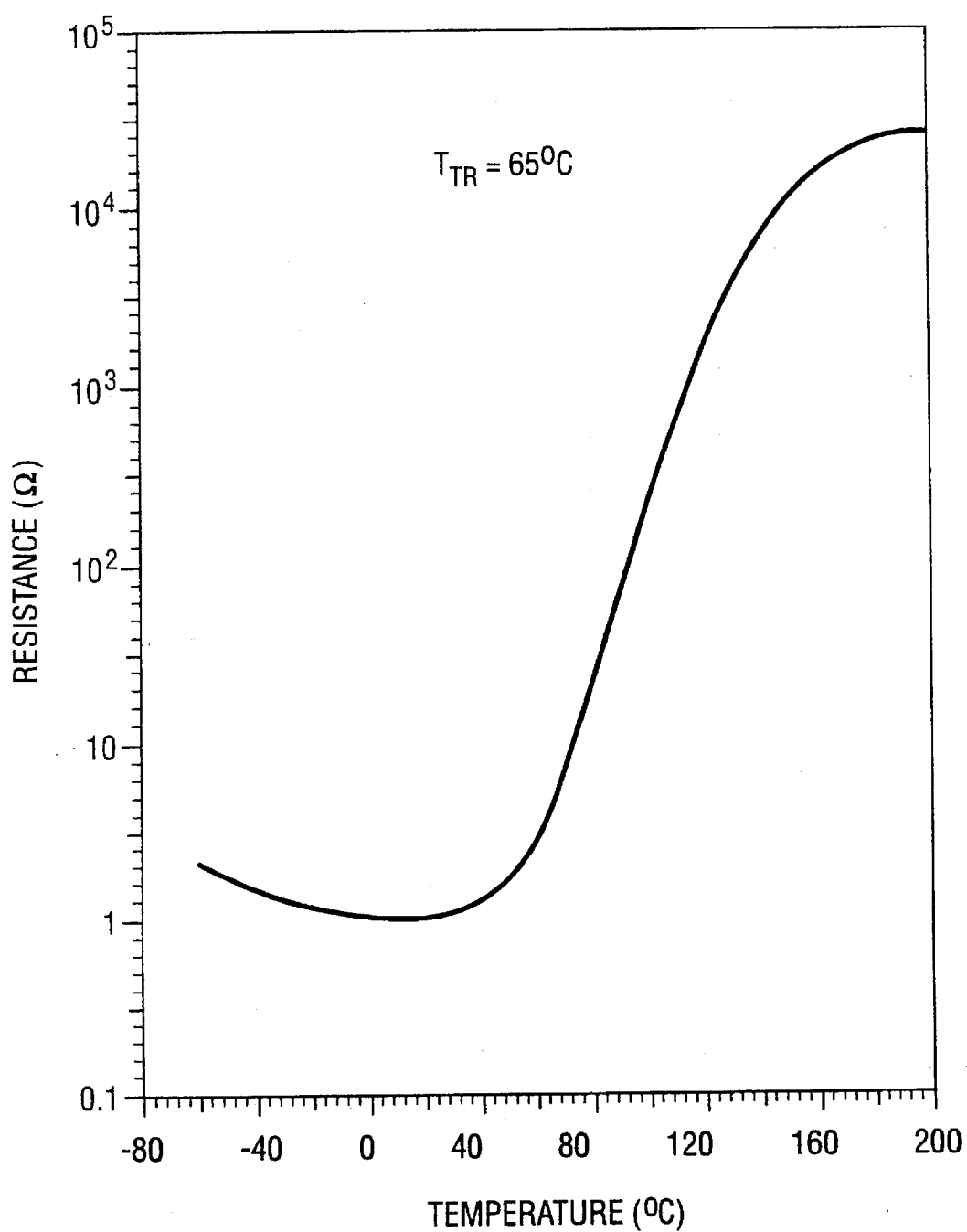
FIG. 6 illustrates a typical resistance/temperature curve for a PCT resistor.

The status monitoring devices of the present invention employ a plurality of LED devices to monitor a plurality of levels in a water tank or waste tank suitable for use in a recreational vehicle or pleasure boat. The device contains no moving parts, and employs no transistors or other integrated circuits requiring a power supply having a voltage different from that of the basic direct current voltage supply system of the vehicle or pleasure boat itself.

Referring now to FIG. 1, a level sensing probe 1 useful with the device as claimed herein comprises a plastic tube support 3 on which are mounted PTC resistors 5 and 7. The tube may be made of alternative materials such as metal, but is preferably corrosion resistant metal having low thermal conductivity and most preferably a relatively low thermal conductivity polymer material. One PTC resistor shown at 5 is mounted at a lower position than at least a second PTC resistor shown at 7. The lower of the two PTC resistors may be advantageously sealed at the end of the plastic tube, which is preferably hollow. The upper PTC resistor may be located in a hollow in the exterior wall of the tube or merely attached to the tube itself, the connecting wires passing through the wall of the tube.

The PTC resistors are sealed with epoxy or other polymer materials to prevent entry of fluid into the plastic tube, and to seal the electrical connections of the PTC resistor from the environment, thus rendering the device suitable for use in salt water environments. The entire tube is advantageously epoxy sealed or filled. A brass fitting 4 located at the top of the tube is used to fix the tube to the tank. Polymer fittings, either machined or injection molded, may be used as well. Further, the entire sensing element body, including probe and fitting, may be molded as one unitary piece. The fitting may be a screw-type fitting or may be an alternative fitting which is attached by screws or bolts, solvent-bonded, adhesive-bonded, or secured by other means, generally such so as to prevent any leakage past the device.

The wires 9 from the PTC unit may be directly connected to the monitoring and indicating circuitry, or may, as shown in the drawing, be attached to connector 11, which is subsequently connected to the monitoring and indicating circuitry by means of a corresponding connector. The heights of the PTC resistors relative to the tank and relative to each other may be selected as desired. For example, in a waste tank, the lower PTC resistor and the length of the plastic tubing on which it is mounted is generally selected to place the PTC resistor at a position where the waste tank is half-filled or three-fourths filled. The upper PTC resistor is placed on the plastic tubing at a height to indicate a filled or nearly filled condition.

In the case of a water tank, the lower PTC resistor is located toward the bottom of the plastic tubing to indicate an empty or nearly empty condition, while the upper PTC resistor is located on the plastic tube at a height sufficient to indicate a half-empty or three-fourths empty condition. Additional PTC resistors may be employed as desired to indicate other conditions of fill, however, this is generally not necessary. The number of PTC sensor elements preferably ranges from 2 to 4, more preferably from 2 to 3. While the number of sensor elements in theory may be larger, for example 10, such remote indicating devices will have a large current draw. However, in some applications, for example in large pleasure boats, such larger current draws may be quite acceptable, especially when the device is powered on in conjunction with the ignition switch.

Referring now to the portion of FIG. 2 within the dashed box "B" containing the essential portions of the circuitry, $PTC^1$ represents a positive temperature coefficient resistor located within a waste tank at a level sufficient to indicate a partially-filled condition consistent with the discussion of the sensing element in FIG. 1. Resistor $R^1$ serves the dual purpose of a current limiting resistor, limiting the current to $PTC^1$ and also of a voltage dropping resistor which provides a bias voltage to illuminate $LED^1$ at the appropriate time. $PTC^2$ is a positive temperature coefficient resistor located in the waste tank at an upper position to indicate a filled or nearly-filled condition and is current limited as in the case of $PTC^1$ by resistor $R^2$, which further serves the purpose of a voltage dropping resistor to bias $LED^2$ under the appropriate circumstances.

In operation, when the waste tank contains waste at a level lower than the level of either $PTC^1$ or $PTC^2$, the current supply to the two PTC resistors through $R^1$ and $R^2$, respectively, cause the PTC resistors to increase in temperature due to their internal resistance, further increasing their resistance as these devices have a positive temperature coefficient. Within a relatively small time period, on the order of 15–20 seconds, each of the PTC resistor's temperatures will rise to the point where the temperature increases beyond the Curie point of the devices, raising the resistance of these devices to a high value.

Under these circumstances, very little current flows through either $R^1$ or $R^2$, and thus virtually no voltage drop occurs across these resistors, and $LED^1$ and $LED^2$ are not illuminated. Should the level of waste in the waste tank rise to the level of $PTC^1$, indicating a partially-filled condition such as half-full or three-fourths full, the PTC resistor will be cooled by the fluid surrounding it, thus lowering its resistance into the low resistance region, under which circumstances a current of approximately 250 milliamps will flow through resistor $R^1$ causing a voltage drop across $R^1$ which is sufficient to illuminate $LED^1$. At the same time, $PTC^2$ remains in the air above the liquid in the waste tank, substantially preventing current from flowing through $R^2$, and thus $LED^2$ remains in an off condition. The on condition of $LED^1$ alerts the operator to the fact that a partially-filled condition has been reached. Should the level of waste in the waste tank rise to the level of $PTC^2$, indicating a nearly-filled or filled condition, $PTC^2$ will then encounter heat loss through conduction into the waste fluid, decreasing the resistance of $PTC^1$ and causing a voltage drop across $R^2$, thus causing $LED^2$ to emit light.

Under these conditions, both $LED^1$ and $LED^2$ will be illuminated, representing a total current draw of approximately 500 milliamps. The operator is thereby alerted to the fact that the waste system should not be activated, but rather should be emptied.

The portion of FIG. 2 within dashed box "A: is optional, and may also be used in conjunction with the circuits shown in FIGS. 3 and 4. This optional portion of the device will be discussed later.

FIG. 3 illustrates a schematic diagram useful for a status monitoring device for a water tank. In the case of a water tank monitoring device, rather than indicating a partially-filled or fully-filled condition, it is desirable to indicate a partially empty or fully empty condition. Therefore, the LED indicating devices which alert the operator to the appropriate conditions are biased by the voltage drop across the PTC resistors rather than the current limiting resistors.

Thus, in FIG. 3, $PTC^3$ is located at a level in the tank sufficient to indicate a partially empty condition, such as half-empty or three-fourths empty, and under these circumstances, is surrounded by air, under which circumstances the temperature of the PTC device rises and the resistance increases to a high level. The voltage drop across the PTC resistor is then sufficient to cause $LED^3$ to illuminate, alerting the operator to this condition.

When the level of water in the water tank is above the level of $PTC^3$, the cooling effect of the water lowers the temperature of $PTC^3$, causing its temperature to drop and resistance to decrease to the low resistance region of the PTC resistance/temperature curve. Under these conditions, the major voltage drop in this arm of the circuit is across $R^3$ rather than $PTC^3$, and the voltage drop across the PTC resistor is not sufficient to illuminate $LED^3$. As the level of water in the water tank drops further to the point where it is lower that $PTC^4$, $PTC^4$ will then become exposed to air rather than liquid, and its temperature will increase, increasing the resistance and associated voltage drop and thereby illuminating $LED^4$. As in the case with $PTC^3$, when $PTC^4$ is surrounded by liquid, its resistance drops to a low value, reducing the voltage drop across it to a value insufficient to illuminate $LED^4$.

FIG. 4 illustrates a combination circuit which may be used to alternatively monitor the waste level or the water level. In this schematic, $R^1$, $R^2$, $R^3$, $R^4$; $PTC^1$, $PTC^2$, $PTC^3$, $PTC^4$; and $LED^1$, $LED^2$ provide the same operations and effects as illustrated in FIGS. 2 and 3, respectively. In FIG. 4, however, only two LEDs are utilized to indicate the status of both the water tank and the holding tank alternatively. The LEDs are toggled to the appropriate circuitry through the use of a double-pole, double-throw switch 15 which biases the respective LEDs across either the respective voltage dropping resistor in the case when the waste tank status is being monitored, or across the respective PTC resistor when the status of the water tank is being monitored. Preferably, the double-pole, double-throw switch contains a center-off position whereby the LEDs are not connected to either circuitry. The use of the circuitry of FIG. 4 is particularly advantageous, in that only two LED devices are used, and thus it becomes economical, even in low end recreational vehicles and pleasure boats, to install both water tank and waste tank monitoring devices, preferably activated through the ignition switch.

FIG. 5 illustrates suitable panel display devices, located at a suitable monitoring point. FIG. 5a illustrates a holding tank status panel with holes suitable to receive full 19 and ¾ full 21 LED devices. At 23 is located an on/off switch to connect or disconnect the device from the direct current electrical system, and at 25 is shown a fuse for limiting current and thus preventing damage to components should a malfunction occur.

In FIG. 5b is illustrated a combination panel employing three level indicating LED devices located at 27, 29 and 31. When toggle switch 33 is thrown to the right, the LED devices are biased by the voltage drop across the PTC water tank sensor elements to indicate water tank status. When toggle switch 33 is thrown to the left, the LED devices are biased by the voltage drop across the current limiting resistors associated with the respective waste tank sensor elements to indicate waste tank status. The center position of toggle 33 may represent an off condition with the direct current electrical system disconnected from the device. At 35 is an optional fuse.

The level sensing device as illustrated in FIG. 1 is preferably manufactured utilizing a plastic tube into and onto which the PTC resistors are mounted using a sealing resin, preferably an epoxy resin. The plastic tubing may be made of numerous materials, for example, polyethylene, polytetrafluoroethylene, polypropylene, PVC, polyoxymethylene, and the like. The plastic materials should be relatively resistant to aqueous fluids. The plastic tubing may be secured in the fitting, by means of which the device is to be attached to the water tank or holding tank, by securing with epoxy resin, or in the case where the fitting is made of a plastic material, by solvent or adhesive bonding. Alternatively, the plastic tubing may be secured in the fitting through the use of an O-ring compression seal. The method of sealing the plastic tube into the fitting is not particularly critical, and many alternative embodiments may suggest themselves to one or ordinary skill in the art. As the cost of the sending unit components is relatively low, the unit may be designed so as to be replaced only as a single unit, or may be designed, for example with compression seals as indicated previously, such that the plastic tubing and probe assembly may be replaced without replacing the fitting itself. The wiping effect which may occur with a partially loosened compression fitting or O-ring seal as the plastic tube is withdrawn encourages replacement, particularly with respect to the waste tank.

The PTC resistors exhibit a relatively low resistance until the temperature of the device reaches the so-called "turnover temperature" at which time the resistance of the device increases substantially. The turnover temperature is often referred to as the Curie temperature. Such devices are made of single crystal semiconductive material other than traditional germanium or silicon semiconductor materials, for example barium titanate. However, alternative resistors displaying the same effects, i.e. a low initial resistance, and a resistance above the turnover temperature, preferably larger by two or more orders of magnitudes will suffice as well. It is desirable that the PTC resistor have as low a thermal mass as possible, and therefore require a low current to trip into the high resistance state. A preferred device is a PTC resistor manufactured by Raychem Corporation, designated RXE 010. The PTC resistor preferably has an initial resistance of from 2–10 ohms.

The LED devices are commercially available. Preferably, the LED devices which indicate, in the case of a holding tank, a partially-filled condition, or in the case of a water tank, a partially-empty condition, are green or yellow LED devices. Suitable LED devices are 5102H1-5V and 5102H3-5V, distributed by Industrial Devices, Inc., Hackensack, N.J. 07601. In the case of the LED devices utilized, for waste tanks to indicate a filled condition, or in the case of a water tank to indicate an empty condition, the preferred LED is a red LED, most preferably a blinking red LED device. A suitable device is 5100H1FL, distributed by Industrial Devices, Inc., Hackensack, N.J. 07601. Such LED devices are operable, i.e. emit visible light, when biased by a voltage which exceeds the threshold "turn-on" voltage. A nominal turn on voltage for such device is on the order of 2–5 volts. Some LED devices contain an integral resistor to allow use directly with 12 volt systems, in which case the circuitry may be modified accordingly.

Once a particular PTC resistor and LED device are selected for any particular arm of either a waste tank or water tank circuit, the resistance value of the current limiting and, in some case biasing, resistors is readily calculated by one of ordinary skill in the art. The minimum current flow through each arm of the parallel circuit branch including a current limiting resistor and at least one PTC resistor must be such that the PTC resistor will self-heat in air or gas to a temperature above the turnover temperature. In the case of the waste tank device, whereby PTC resistor is the RXE 010 device mentioned previously, the current limiting resistors may suitably have a value of 35 ohms. In the case of the water tank circuits, the voltage limiting resistors may be somewhat higher in resistance, as the large resistance of the PTC resistor when uncovered by liquid, provides the voltage bias necessary to turn the respective LED devices on. In such cases, the voltage limiting resistors may have values of 50–60 ohms.

The status indicating devices of the present invention may be advantageously directly connected to the ignition switch of the recreational vehicle or pleasure boat, in order to be operational while the engines of such vehicles are running, or preferably are controlled by an independent, single-throw, single-pole switch which interrupts the positive 12 volt supply line. In FIG. 2, in the dotted box identified "A" are located optional single pole switch 17 and fuse 19. This same circuitry may be used in other embodiments. In the device shown in FIG. 4, wherein a double-throw switch is utilized to alternatively connect the light-emitting diodes to the waste tank status indicator circuitry or the water tank indicator circuitry, the switch may be arranged such that the center position of the switch, wherein the LEDs are connected to neither circuit, also effectively removes the voltage from the circuits so that there is no drain on the battery under such conditions.

The particular configuration of the status indicator is not critical, and may be adapted depending upon whether the device is installed initially in a recreational vehicle or pleasure boat by the manufacturer, or as an after-market add-on device. When supplied as an OEM device, the LED indicators, fuse, and on/off switch or toggle switch, where required, are advantageously merged into the remaining components on the dashboard or pleasure boat control panel. When utilized as an after-market add-on device, preferably a plastic plate having the necessary engravings, for example, a title indicating that the device is for "holding tank status" or "water tank status" and "full" and "three-fourths" or "half-full" legends, "on-off" legends for the on-off switch, etc. are preferably applied. Suitable panels are shown in FIGS. 5A and 5B. In the case where a combination circuit is utilized, in conjunction with a center off double-throw switch, the double-throw switch may be advantageously located in the middle, between columns of "full", "three-fourths full" and other legends appropriate to the holding tank or water tank respectively. In such cases, the direction of the switch throw should indicate which legends are to be read.

Unlike prior art devices, many of which rely on mechanical components, the subject invention status indicators contain no moving parts in the respective tanks, and therefore are far more reliable than prior art devices. Furthermore, as the sensing device relies only on thermoconductivity of the liquid or air surrounding it, there are no conductivity or other electrical probes which might be fouled by the container contents. The fact that no electrical power is actually transmitted by the liquid in the container eliminates the possibility of electrolysis of the aqueous solutions contained therein, and the evolution of hydrogen gas, as well as the introduction of metal ion contaminants into the contained liquid. Finally, by virtue of being sealed within an essentially non-corrosive device, the system of the present device is not subject to corrosion in salt water environments.

Having now fully described the invention, it will be apparent to one of ordinary skill in the art that many changes and modifications can be made thereto without departing from the spirit or scope of the invention as set forth herein. The drawings which form part of the application hereof are illustrative only, submitted for the purpose of understanding and appreciating the invention, and are not to be construed as limiting the scope of the invention as defined in the claims hereinafter set forth.

What is claimed is:

1. A transistor and integrated circuit-free device for remotely indicating the fill status of a liquid-containing holding tank on a recreational vehicle or pleasure boat having a direct current voltage supply, comprising:
   (a) at least one sensing element comprising a support adapted to be inserted in a holding tank;
   (b) a plurality n of sensor elements fixedly mounted to said sensing element, said sensor elements positioned at different heights relative to said liquid contained in said tank, the height of each of said sensor elements corresponding to a level of liquid whose status is to be monitored, each of said sensor elements comprising a positive temperature coefficient resistor characterized by a resistance/temperature curve exhibiting relatively low resistance below a given temperature, and a steeply rising resistance above said given temperature;
   (c) a parallel electrical circuit having n branches, said parallel electrical circuit biased by said direct current voltage supply, each of said branches comprising at least one of said sensor elements and a current limiting resistor associated therewith;
   (d) a plurality of light emitting diodes having a non-emitting off-state and an emitting on-state, mounted remotely from said sensor elements, each of said light emitting diodes associated with a branch of said parallel circuit such that the on/off-state of said light emitting diode changes in response to said liquid level passing the position of the sensor element which forms a part of the same parallel circuit branch with which said light emitting diode is associated.

2. The device of claim 1 wherein said holding tank is a waste tank, wherein one of said sensor elements is positioned proximate to the top of said waste tank to monitor the status of a filled or substantially filled condition, and at least one sensor element is positioned at a lower level to indicate a partially filled condition.

3. The device of claim 2 wherein said light emitting diodes are electrically connected across said current limiting resistor, the voltage drop across said current limiting resistor, when the temperature of said sensor element is below the point where the sensor element resistance steeply rises, being sufficient to cause the light emitting diode associated with said parallel circuit branch to emit light.

4. The device of claim 3 comprising one of said sensing elements, said sensing element being of low thermal conductive polymer material.

5. The device of claim 1, further comprising:
   (e) an electrical switch having at least two positions, one of said positions connecting said parallel circuit to said direct current power supply, the other of said positions disconnecting said parallel circuit from said direct current power supply.

6. The device of claim 1, further comprising:
   (f) a fuse connected in series with said direct current power supply and said parallel circuit.

7. The device of claim 5, further comprising:
   (f) a fuse connected in series with said direct current power supply and said parallel circuit, the current rating of said fuse selected so as to prevent damage to the device components due to excess current.

8. A transistor and integrated circuit-free device for remotely indicating the fill status of a waste tank on a recreational vehicle or pleasure boat having a direct current voltage supply, comprising:
   (a) at least one sensing element comprising a support adapted to be inserted in a holding tank;
   (b) means for attaching and sealing said support in said waste tank;
   (c) a plurality n of sensor elements fixedly mounted to said sensing element, said sensor elements positioned at different heights relative to waste contained in said tank, the height of each of said sensor elements corresponding to a level of waste whose status is to be monitored, each of said sensor elements comprising a positive temperature coefficient resistor characterized by a resistance/temperature curve exhibiting relatively low resistance below a given temperature, and a steeply rising resistance above said given temperature;
   (d) a parallel electrical circuit having n branches, said parallel electrical circuit biased by said direct current electrical supply circuit, each of said branches comprising one of said sensor elements and a current limiting resistor associated therewith;
   (e) a plurality of light emitting diodes having a non-emitting off-state and an emitting on-state, mounted remotely from said sensor elements, each of said light emitting diodes associated with a branch of said parallel circuit such that the on/off state of said light emitting diode changes in response to said waste level passing the position of the sensor element which forms a part of the same parallel circuit branch with which said light emitting diode is associated.

9. The device of claim 1 wherein said holding tank is a water tank, wherein one of said sensor elements is positioned proximate to the bottom of said water tank to monitor the status of an empty or substantially empty condition, and at least one sensor element is positioned at a higher level to indicate a partially empty condition.

10. The device of claim 9 wherein said light emitting diodes are electrically connected across said sensor element, the voltage drop across said sensor element, when the sensor element associated with said light-emitting diode has a high resistance due to the temperature of said sensor element being above the temperature at which the resistance of said sensor element steeply rises, is sufficient to cause said light emitting diode to emit light.

11. The device of claim 10 comprising one of said sensing elements, said sensing element being of low thermal conductive polymer material.

12. A transistor and integrated circuit-free device for remotely indicating the fill status of a water tank on a recreational vehicle or pleasure boat having a direct current voltage supply, comprising:
  (a) at least one sensing element comprising a support adapted to be inserted in a water tank;
  (b) means for attaching and sealing said support in said water tank;
  (c) a plurality n of sensor elements fixedly mounted to said sensing element(s), said sensor elements positioned at different heights relative to said water contained in said tank, the height of each of said sensor elements corresponding to a level of water whose status is to be monitored, each of said sensor elements comprising a positive temperature coefficient resistor characterized by a resistance/temperature curve exhibiting relatively low resistance below a given temperature, and a steeply rising resistance above said given temperature;
  (d) a parallel electrical circuit having n branches, said parallel electrical circuit biased by said direct current electrical supply circuit, each of said branches comprising one of said sensor elements and a current limiting resistor associated therewith;
  (e) a plurality of light emitting diodes having a non-emitting off-state and an emitting on-state, mounted remotely from said sensor elements, each of said light emitting diodes associated with a branch of said parallel circuit such that the on/off state of said light emitting diode changes in response to said water level passing the position of the sensor element which forms a part of the same parallel circuit branch with which said light emitting diode is associated.

13. A transistor and integrated circuit-free device for alternatively monitoring the fill status of a water tank and a waste tank on a recreational vehicle or pleasure boat having a direct current power supply, comprising:
  (a) at least one water tank sensing element comprising a support adapted to be inserted in said water tank and a plurality n of water tank sensor elements fixedly mounted to said water tank sensing element(s), said water tank sensor elements positioned at different heights relative to the level of water in said water tank, the height of each of said water tank sensor elements corresponding to a level of water whose status is to be monitored;
  (b) at least one waste tank sensing element comprising a support adapted to be inserted in said waste tank, and a plurality n of waste tank sensor elements fixedly mounted to said waste tank sensing element, said waste tank sensor elements positioned at different heights relative to the level of waste in said waste tank, the height of each of said waste tank sensor elements corresponding to a level of waste whose status is to be monitored;
  wherein said waste tank sensor elements and water tank sensor elements comprise positive temperature coefficient resistors characterized by a resistance/temperature curve exhibiting relatively low resistance below a given temperature and a steeply rising resistance above said given temperature;
  (c) a parallel electrical circuit having n water tank monitoring branches and n waste tank monitoring branches, each of said water tank monitoring branches comprising a water tank sensor element and a current limiting resistor associated therewith, each of said waste tank monitoring branches comprising a waste tank sensor element and a current limiting resistor associated therewith;
  (d) n light emitting diodes
  (e) means for alternatively connecting each of said n light emitting diodes across a respective current limiting resistor associated with a respective water tank sensor element when the status of said water tank is to be monitored, and across a respective waste tank sensor element when said waste tank status is to be monitored, such that said n light emitting diodes alternatively monitor water tank or waste tank status;
  wherein when said connecting means is in a position selecting water tank status monitoring, the voltage drop across the respective water tank sensor elements associated with the respective light-emitting diode is such as to cause said light emitting diode associated with the respective water tank sensor element to emit light when said respective sensor element is in a high resistance condition due to the water level in said water tank falling below the position of the respective water tank sensor element, allowing said respective water tank sensor element temperature to rise above said given temperature;
  wherein said voltage drop across a respective water tank sensor element is insufficient to cause said light-emitting diode associated therewith to emit light when said respective water tank sensor element is in a low resistance condition due to being immersed in water;
  wherein when said connecting means is in a position selecting waste tank status monitoring, the voltage drop across a respective current limiting resistor associated with said light emitting diode is such to cause said light emitting diode to emit light when the respective waste tank sensor element is in a low resistance condition due to being immersed in waste; and
  wherein said voltage drop across the respective current limiting resistor associated with said light emitting diode is insufficient to cause said light emitting diode to emit light when the respective waste tank sensor element is in a high resistance condition due to being positioned above the level of waste in said waste tank, allowing the temperature of said respective waste tank sensor element to rise above said given temperature.

14. The device of claim 13 wherein said switch further contains a center off position.

15. The device of claim 13 wherein the switch is a toggle switch wherein the direction of throw of the switch indicates the tank whose status is being monitored.

16. The device of claim 13, wherein said switch further connects said parallel circuit to said direct current voltage supply when said switch is in position to monitor the status of a selected tank.

17. The device of claim 2, wherein said positive temperature coefficient resistor has an initial resistance of from 2 ohms to 10 ohms.

18. The device of claim 9, wherein said positive temperature coefficient resistor has an initial resistance of from 2 ohms to 10 ohms.

19. The device according to claim 17, wherein said positive temperature coefficient resistor comprises barium titanate.

20. The device according to claim 18, wherein said positive temperature coefficient resistor comprises barium titanate.

* * * * *